Feb. 16, 1954     K. S. CHRISTENSEN     2,669,133
METHOD AND APPARATUS FOR PRODUCING PINKING SHEARS
Filed June 18, 1949     2 Sheets-Sheet 1
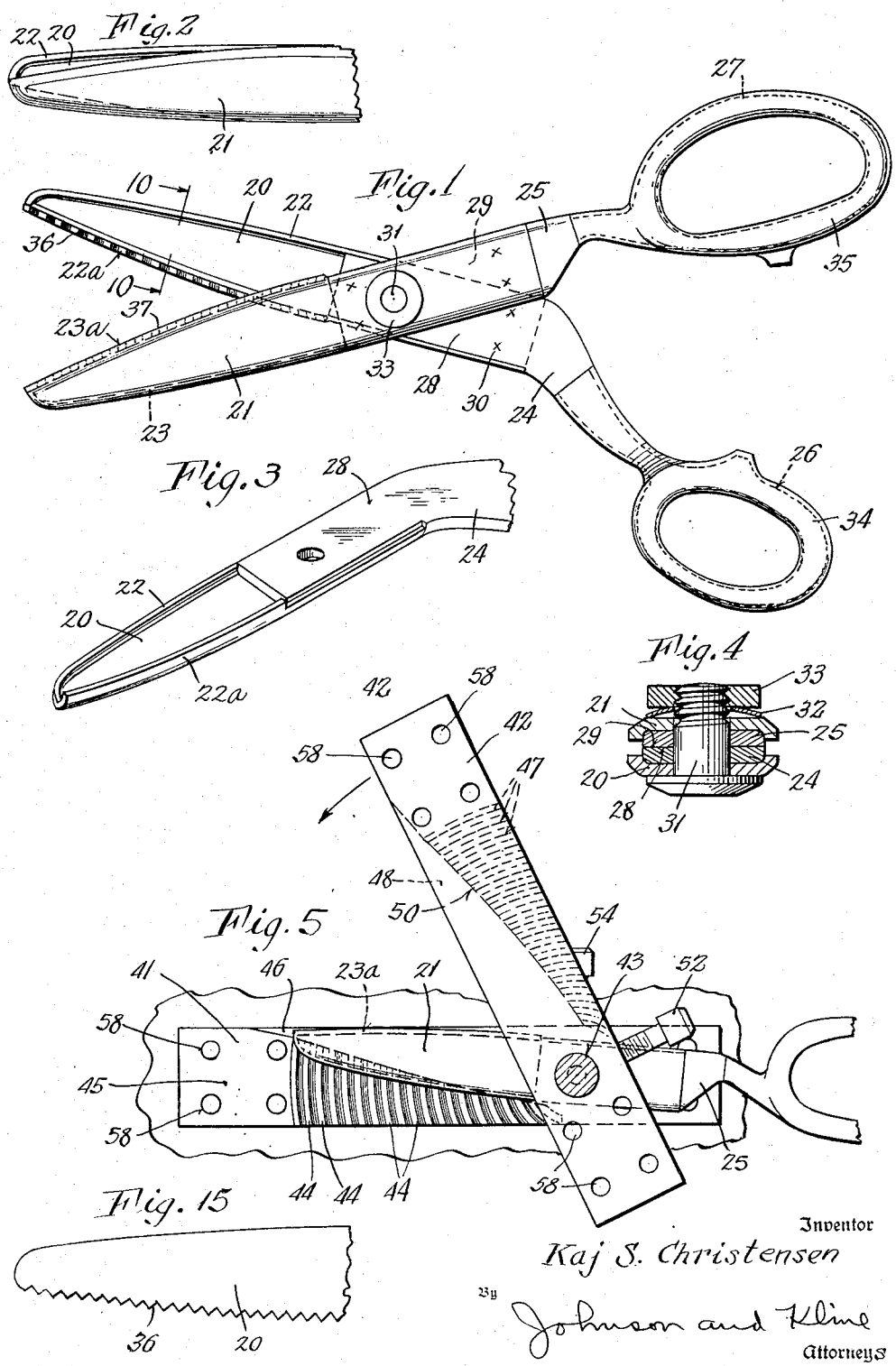
Inventor
Kaj S. Christensen
By Johnson and Kline
Attorneys

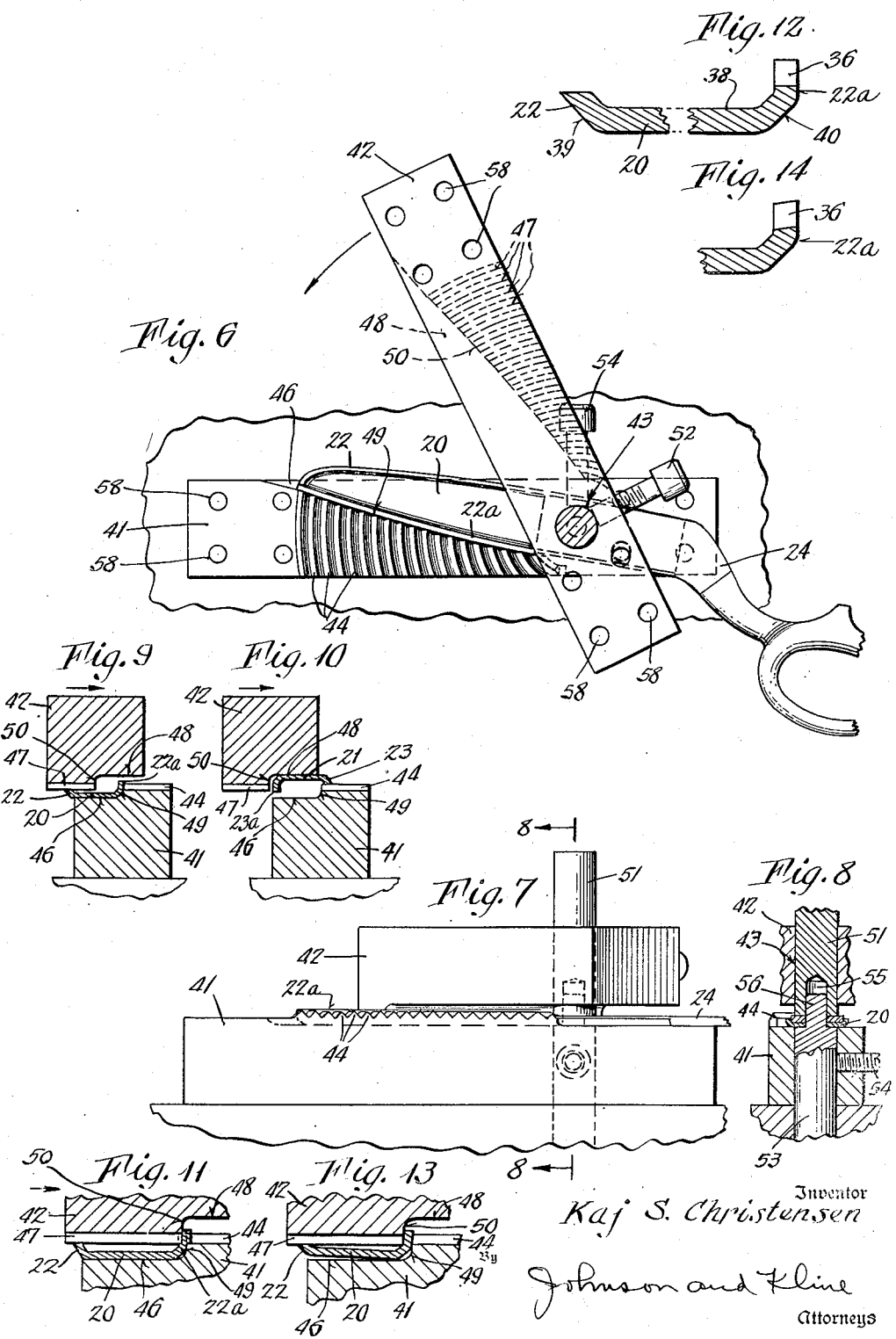

Patented Feb. 16, 1954

2,669,133

UNITED STATES PATENT OFFICE 2,669,133

METHOD AND APPARATUS FOR PRODUCING PINKING SHEARS

Kaj S. Christensen, Norwalk, Conn.

Application June 18, 1949, Serial No. 99,983

4 Claims. (Cl. 76—104)

This invention relates to pinking shears, and to methods and means for producing the same.

An object of the invention is to provide an improved and simplified pinking shears capable of cutting fabric and the like which is very economical to produce, being low in material and fabrication cost, and which is extremely durable and effective in its operation.

Another object of the invention is to provide an improved method for manufacturing pinking shears, which is simple and economical to carry out so that the cost of the shears may be held to a very low, attractive figure in a range calculated to attracted volume sales.

Still another object of the invention is to provide an improved apparatus for producing a pinking shears characterized as above, which apparatus is simple and inexpensive to construct, is reliable in use, and has a high production rate and low upkeep.

A further object of the invention is to provide improved sheet-metal pinking shear blades which are by themselves very rigid, sturdy and durable, which may be quickly and economically fabricated, and the cutting surfaces of which are perfect complements of each other whereby an efficient and effective cutting action is had, enabling the blades to effectively handle all types of cuttable fabric materials.

In accomplishing the above objects there is provided, in accordance with the invention, a pinking shears having novel, improved blades which are formed entirely of sheet metal, the blades being so flanged, shaped and arranged as to produce a desirably rigid, rugged and durable device which is extremely effective in its operation.

In the specific embodiment of the invention illustrated herein this improved pinking shears comprises not only novel, sheet-metal blades, but also novel assemblages including sheet-metal operating extensions or handles for the blades, said blades and handles being secured together and disposed in overlapping relation at the pivot of the shears and the extensions providing large, flat bearing surfaces which accurately control the relative positions of the blades. Both the blade parts and the handle parts may be quickly and easily blanked and formed to the disclosed shapes and readily assembled to each other with a minimum of time and equipment being required; this, together with the low cost of the materials required to fabricate these parts, results in a product which is extremely economical to produce.

The sheet metal blades are formed by first shearing tapered, elongate, identical blanks from a piece of sheet metal, and then folding up flanges along the longitudinal edges of the blanks, the flanges of each blade extending laterally toward the complementary blade when these parts are assembled. One flange of each blade is sheared through in a novel manner, embracing a plurality of different directions, to form teeth therein which have edge surfaces angularly disposed to enable the teeth of one flange to be perfectly complementary with the teeth of the other flange in accurate cutting relationship when the blades are pivoted together and closed on each other. Except for a lapping operation of limited extent, and duration, the shearing through of each flange in the said different directions to form teeth, constitutes the major final shaping or processing of the working edges of the shear blades. This method therefore eliminates the usual grinding, milling and other costly forming operations heretofore required.

I prefer to shear through the flanges of the blades more than once, the final shearing operation being essentially a dressing down of teeth which have been previously formed by shearing, and such dressing down removing but a small amount of material. The first shearing operation to initially form the teeth may be done after the flange has been bent up in the blade, or it may be done prior to the bending of the flange, in the longitudinal edge of the blade while the latter is a flat blank.

The novel shearing of the flange, in the plurality of different directions by which the final shape or configuration is given to the teeth, is accomplished quickly and economically by an improved shearing tool provided by the invention, comprising two cooperable elongate die members pivotally connected together to enable them to be swung closed and separated in the manner of pivoted shears; said die members having complementary teeth on opposite working edges, extended in curves whereby the surfaces of the extensions form curved V-grooves concentrically disposed about the pivotal axis of the die members. Means are provided for releasably connecting the members together for pivotal movement, and for positioning flanged blade blanks between the members with the pivotal center of the blank at the pivotal axis of the members, the blank being thereby held in position to have its flange sheared through by the members. This shearing by complementary teeth formed by concentric V-grooves, results in the flange of the blade being sheared through in a plurality of different directions such that the teeth so formed are properly related to the pivotal point of the blade to enable a perfect cutting relationship to exist with a complementary blade. Both blade blanks, after being flanged and prior to shearing through the flanges thereof to form the teeth, are identical to each other in all respects. A blade blank may be inserted between the die members in one position whereby its flange is sheared through by engagement of one die member with the outside of the flange, and a second blade blank may be placed between the die members in a reversed position whereby its flange is sheared through by the said one die member engaging the inside of the flange. By such arrangement perfectly complementary teeth are formed in the flanges of the two blades, so that when the blades are pivotally secured together the teeth cooperate perfectly and have an accurate and precise cutting relationship.

The flange on the other edge of each blade reinforces the blade against springing in use and controls the cutting of the teeth in the other flange during the shearing operation as will be more fully explained.

Simplicity and economy, together with durability and effective operation, are thus accomplished by the use of economical sheet metal in forming the blades, by the use of simple shearing tools having few salient working parts, and by the use of simple, rapid processing operations involving shearing of teeth in both blades by the same tools in a manner to enable one set of teeth to be perfectly complemental to the teeth of the other set.

Other features and advantages will hereinafter appear.

In the accompanying drawings:

Figure 1 is a plan view of an improved sheet-metal pinking shears made in accordance with the invention.

Fig. 2 is a fragmentary plan view of the tip portions of the shears, as they appear when the blades are closed.

Fig. 3 is a fragmentary perspective view of an assembly of a flanged blade blank and attached handle extension, prior to forming the teeth in the flange.

Fig. 4 is a transverse section taken through the pivot of the shears.

Fig. 5 is a top view of a shearing tool for forming the teeth in the flanged blades, one blade assembly being shown in position between the tool members, in readiness for processing.

Fig. 6 is a view like Fig. 5 but showing the complementary blade assembly of the shears, positioned in the tool prior to the processing.

Fig. 7 is a front view of the tool and blade assembly shown in Fig. 6.

Fig. 8 is a section taken on line 8—8 of Fig. 7.

Fig. 9 is a fragmentary section taken through the cooperable die members and a blade assembly about to be sheared.

Fig. 10 is a view similar to Fig. 9 but showing a complementary blade assembly between the die members, prior to its being sheared.

Fig. 11 is a fragmentary view similar to Fig. 9 but enlarged and showing a flange partly sheared through.

Fig. 12 is an enlarged transverse section through a blade, said section being taken on line 10—10 of Fig. 1 and illustrating the sheared teeth in the flange, formed in accordance with the steps of the process indicated in Figs. 9 and 11.

Fig. 13 is a view like Fig. 11 but showing a modified form of blade blank whereby the shearing of the teeth in the flange of the blade results in the tooth surfaces being relieved.

Fig. 14 is a view like Fig. 12 but showing a tooth with relieved surfaces, as formed by the process illustrated in Fig. 13; and Fig. 15 is a fragmentary plan view of a blade blank prior to the flanges being formed thereon, one longitudinal edge of the blank having teeth formed in it by the blanking operation, this figure illustrating a modification of the process of the invention.

Referring to Figs. 1–4 and 12, the improved pinking shears of the invention comprises a pair of complementary blades 20 and 21 formed of sheet metal; said blades are generally flat and are provided on their opposite longitudinal edges with relatively narrow flanges 22 and 23, and relatively wide flanges 22a and 23a, the wide and narrow flanges meeting at the tips of the blades. The blades 20 and 21 are provided with extension pieces 24 and 25 stamped from sheet metal and having handle portions 26 and 27. The extensions 24 and 25 have relatively large bearing portions 28 and 29 which engage each other and which are nested in the blades 20 and 21 and are secured thereto preferably by spot welding as indicated at 30. The assembled blades and handles are apertured and are held together with a required pressure by a pivot bolt 31 carrying a spring washer 32 and nut 33, Fig. 4.

The handle portions 26 and 27 of the shears may be formed integrally with the extensions 24, 25, or if desired be covered by any suitable material such as plastic, formed into jackets 34 and 35.

By an improved and novel process hereinafter described, the wide flanges 22a and 23a of the blades 20 and 21 are provided with complementary teeth 36 and 37, adapted to operate in cutting relation to each other whereby the shears may be used for pinking fabric or other materials.

The blades 20 and 21 are preferably identical to each other except for the formations of the teeth 36 and 37 in the wide flanges 22a and 23a. As shown in Fig. 12, the distance between the roots of the teeth in the wide flange 22a and the inside surface 38 of the blade is at least as great as, and preferably slightly greater than, the effective width of the narrow flange 22, thereby to enable the crests of the teeth in the wide flanges to clear the narrow flanges when the blades are closed.

Further, the flanges on each edge of the blades strengthen the blades against springing thereof during a cutting operation with the attendant pulling of the fabric rather than cutting it.

I have found that a blade structure made in accordance with the invention, of sheet metal shaped and arranged as set forth above and illustrated in Figs. 1–4 and 12, when formed of a stock of suitable thickness, is extremely durable and rigid, and not only entirely satisfactory but very advantageous when used in shears to pink cloth, fabric and the like; and that blades so formed have highly desirable characteristics, being sturdy, wear resistant, light in weight, and economical to fabricate by tools which have a low upkeep. Moreover, the complementary blades may be made from the same blanks, since they are identical to each other up to the point where the teeth are formed in the wide flanges 22a and 23a. Thus a tool and inventory economy is effected. The flanges of the blades may be made to extend angularly laterally with respect to the blade bodies whereby an attractive and desirable bevel is provided along the outer longitudinal edges, as indicated at 39 and 40 in Fig. 12. When the blades 20 and 21 are formed of sheet metal of suitable thickness, for example approximately 1/16 of an inch, in the shape and form indicated in the figures and with the narrow and wide flanges along their opposite longitudinal edges, they are rigid and durable, and function effectively to enable a satisfactory cutting action to be obtained by the cooperation of the teeth 36 and 37.

The blades 20 and 21 are economical to fabricate for several reasons, one being that the operations involved are stamping and forming operations, which are simple and may be carried out with considerable speed. Another reason for the economy in fabricating the blades is that the same tools may be used for forming both blades 20 and 21 to their completed shapes, including the teeth 36 and 37; therefore tooling costs are reduced. The handle extensions 24 and 25 for the blades are also economical to fabricate, since they may be formed of inexpensive sheet metal and blanked to the desired shape, and may be secured to the blades by a quick and economical spot welding operation. The method of forming the teeth 36 and 37 in the blades 20 and 21, is economical and at the same time provides perfectly formed teeth which are perfectly complementary to each other throughout the life of the dies whereby, after a simple and short lapping, finishing operation a very smooth action is obtained when operating the shears. Thus I have provided by this invention an improved pinking shears which is sturdy and durable, light in weight, effective in use and extremely economical to fabricate, and which is convenient in use and is of attractive and finished appearance.

The bearing surfaces 28 and 29 provided by the blade extensions 24 and 25 are perfectly flat, and provide a stable assemblage whereby the spacing between the blades is accurately controlled and held during the operation of the shears without the use of the usual shims which require much time and effort to properly assemble and adjust.

In forming the identical blades 20 and 21, they are first blanked out from a piece of sheet metal, and are then subjected to forming tools whereby the flanges 22, 23 and 22a, 23a are bent up. The same blanking and forming tools may be used for both blades.

After the flanging of the blades the teeth 36 and 37 are formed in the flanges by my improved means and method. Referring to Figs. 5 through 11 the tooth forming means or apparatus comprises essentially a shearing tool for shearing through the wide flanges 22a and 23a of the blades in a plurality of different directions whereby perfectly complementary teeth are provided on the sets of blades, the surfaces of the teeth being properly related to the pivot 31 of the blades to enable an accurate cutting relationship to exist, and to enable unimpeded relative pivotal movement of the blades to occur.

As shown in Figs. 5 and 6, the improved shearing tool of this invention comprises a pair of cooperable elongate die members 41 and 42 connected together by a pivot stud assembly 43, Fig. 8, whereby the members may be swung closed or separated in the manner of pivoted shear blades. The die member 41 has a plurality of curved V-grooves 44 provided in its inner face 45, the said grooves being concentric with each other and having a common center at the pivot stud assembly 43. The face 45 of the die member 41 is also relieved or recessed at 46, Figs. 6 and 9, to provide a nest for the blade 20 of the shears, the said blade and handle extension 24 being insertable between the die members positionable by the pivot stud assembly 43 of the tool.

The die member 42 has a plurality of curved V-grooves 47 in its inner face, said grooves being also concentric with respect to each other and having a center in the pivot stud assembly 43. The grooves 47 are staggered with relation to the grooves 44 so as to be perfectly complemental thereto. The die member 42 has a relief or recess 48 in its inner face, Figs. 6, 9 and 10, in which the blade 21 of the shears may be nested when the blade is interposed between the die members as shown in Fig. 5. It will be understood that the edge 49 of the nest 46 in the die member 41 constitutes a leading or cutting edge of the die member, and the same is true of the edge 50 in the die member 42.

The die members 41 and 42 are pivotally connected together by the stud assembly 43 in such a manner that the members may be readily separated from each other to enable a blade to be interposed between them. To accomplish this, the stud assembly 43 is formed of a shank 51 secured to the die member 42 by a set screw 52, and composed of a cooperable shank 53 secured to the die member 41 by a set screw 54. The shank 51 has an axial bore 55 receiving an axial projection 56 on the shank 53, and the extension 56 is of a diameter to enable it to closely fit the apertures in the blade assemblies in the shears. As shown in Figs. 6, 7 and 8, the blade 20 and extension 24 thereof may be positioned between the shanks 51 and 53 with the shank projection 56 passing through the aperture in the blade assembly, and the blade 20 may be nested in the recess 46 of the die member 41 and held thereagainst by the end of shank 51. With such arrangement, as the die member 42 is moved counterclockwise (indicated by the arrow in Fig. 6) the shearing edge 50 thereof will engage the inside of the flange 22a of the blade, and will shear through the flange progressively, starting at the tip of the blade, thereby progressively forming teeth in the flange. Different portions of the flange will be sheared through in different directions by the die members 41 and 42, and the resulting surfaces of the teeth formed by the shearing will have a definite predetermined relationship to the pivotal axis of the die member and of the blade 20, such relationship being that required to enable the teeth to perfectly complement the teeth of the complementary blade 21.

The shearing action set forth above is clearly illustrated in Figs. 9 and 11, which indicate the relative movements of the die members 41 and 42 and the position of the blade 20 while it is being sheared. As will be noted from Fig. 9, the flange 22 will engage the crests of the teeth on die 42 and will control the tilting of the blank during the shearing operation. In this figure the flange 22 is equal to the root of the tooth so that no tilting is permitted. This results in a straight cut through as shown in Figs. 11 and 12. If the flange 22 is less than the root distance, the blade will tilt as shown in Fig. 13 and cut through as shown in Fig. 14 to provide a relieved cutting edge. Thus by properly selecting the height of the flange 22 the shape of the tooth can be controlled.

In accordance with this invention the die members 41 and 42 are also utilized to shear through the flange 23a of the cooperable blade 21 of the pinking shears, and to form the teeth 37, which teeth are perfectly complemental to the teeth 36 formed in the blade 20. To accomplish this, the blade 20 is removed from between the die members and the blade 21 placed between the members but in a reversed position to that occupied by the blade 20 with flange 23 resting on crests of the teeth on die 41. This is clearly shown in Figs. 5 and 10. The blade 21 occupies the recess 48 in the die member 42. The pivots 51, 53 will be adjusted so that blade 21 is pressed against the bottom of the recess by engagement of the end of pivot 53. While the pivots are disclosed herein for purpose of illustration as being held in adjusted position by set screws 52, 54, it should be understood that they may be held by other suitable means as required. When two die members are brought together, continued movement of the die member 42 will cause the flange 23a of the blade 21 to be sheared through whereby the teeth 37 will be formed thereon.

It will be noted that the leading or cutting edge 50 of the die member 42 engages the inside of the flange 22a of the blade 20, whereas it engages the outside of the flange 23a of the blade 21. By this arrangement the teeth 37 formed in the blade 21 are made to be the exact complements of the teeth 36 formed in the blade 20.

It is preferred to cut the blades for each pair of shears in succession. This insures that the teeth of each pair will be identical even though the dies may be worn. When the cutting edges of the dies become dulled, it is merely necessary to take a light cut off of the flange-engaging of the recesses to provide a new cutting edge thereon. Thus it will be seen that normal wear in the dies will not alter the complemental relation between the teeth of both blades and that the cutting edges of the dies can be renewed easily to provide a long die life for accurate and satisfactory use.

After the shearing of the flanges of the blades to form the teeth 36 and 37 therein, the teeth may be given a light lapping or polishing to provide a final fit by assembling the blades 20 and 21 to each other and employing the usual lapping procedure. At present I prefer, prior to such lapping, to dress down the teeth 36 and 37 by placing the blades in a second tool similar to the tool comprising the die members 41 and 42, the second tool removing a very small amount of stock from the teeth previously formed. I have found that as little as .005 inch of stock may be removed in the second shearing operation, to accurately dress down the teeth.

The die members 41 and 42 may obviously be actuated in any suitable manner, and may be provided with threaded holes 58 by which actuating means may be connected to them.

If desired, as shown in Fig. 15, the blade 20 of the shears may be blanked out and the teeth 36 formed therein simultaneously with said blanking while the blade is in the flat state. If this is done, the subsequent forming operation for bending up the flanges 22 and 22a will bring the teeth approximately to the positions shown in Fig. 1, and a subsequent dressing down operation may be employed by the die members 41 and 42 to give the teeth 36 their final finished configuration except for the lapping or finishing operation.

Variations and modifications may be made within the scope of the claims and portions of the improvements may be used without others.

I claim:

1. The method of forming teeth in a set of cooperable, longitudinally flanged, pinking-shear blades each having a leading and trailing edge which includes the steps of shearing through a longitudinal flange on the leading edge of one blade by a pair of cooperable tooth-forming die members one of which engages the inside of the flange while at the same time positioning the trailing edge of the blade by said one die member, and thereafter shearing through a flange on the leading edge of the other blade by the same cooperable die members the said one of which engages the outside of the flange of said other blade, while at the same time positioning the trailing edge of the blade by the other die member, the engagement between the trailing edges of the blades and the die members controlling the relief of the surfaces of the teeth, thereby to cause the toothed flanges to be complementary and engageable with each other in cutting relationship when the blades are pivotally connected and closed on each other.

2. The method of making pinking shears consisting of a pair of pivoted blades having flanged cutting edges which comprises the steps of placing one blade face upward between a pair of pivoted dies movable about the pivot point of the blade and having complemental surfaces defining the pinking teeth; moving the dies relative to one another about the pivot to shear teeth in the flange, each tooth having a cutting surface concentric with the pivot; removing the blade and inserting the other blade, facedownward, between the dies; moving the dies relative to one another about the pivot therefor and for the blade to shear teeth in the flange which are complemental to the teeth in the flange of the other blade, removing the second blade from the dies, and pivotally connecting the blades face to face with the teeth in the flanges in cooperative cutting relation.

3. A tool for shearing through the flanges of flanged pinking-shear blades to form perfectly complementary teeth therein, comprising a pair of cooperable, elongate die members having rows of complementary teeth on opposed working edges, the edge surfaces of the teeth of each member being in predetermined relationship to a center which is located on the member, and out of line radially with the row of teeth thereof, and beyond the end of said row; and means releasably connecting the members together for pivotal movement about the said centers and for positioning a flanged blade blank between the members so that the pivotal center of the blank coincides with the pivotal axis of the members whereby the flange of the blank is held in position to be sheared through by said members, each of said die members having a nest to enable the blade blanks to be reversibly positioned between the members and to lie in one or the other of said nests so that the inside of a flange being sheared through may be engaged by one or the other of the die members according to the position of the blank and said die members having trailing surfaces for engagement with the trailing edges of the blanks.

4. A tool for shearing through the flange of a flanged pinking-shear blade to form teeth therein, comprising a pair of cooperable, elongate die members having rows of complementary teeth on opposed working edges, the edge surfaces of the teeth of each member being in predetermined relationship to a center which is located on the member, and out of line radially with the row of teeth thereof, and beyond the end of said row; and means releasably connecting the members together for pivotal movement about the said centers and for positioning a flanged blade blank between the members so that the pivotal center of the blank coincides with the pivotal axis of the members whereby the flange of the blank is held in position to be sheared through by said members, one of said die members having a nest for receiving the blank, and the other die member having trailing surfaces for engagement with the trailing edge of a nested blank to control the canting of the blank during the shearing of the flange thereof whereby the relief of the sheared surfaces is controlled.

KAJ S. CHRISTENSEN.

References Cited in the file of this patent

UNITED STATES PATENTS

| Number | Name | Date |
| --- | --- | --- |
| 1,366,005 | Jansson | Jan. 18, 1921 |
| 1,465,460 | Alleman | Aug. 21, 1923 |
| 1,903,257 | Dahl | Mar. 28, 1933 |
| 1,958,147 | Kelley | May 8, 1934 |
| 1,959,190 | Wyner et al. | May 15, 1934 |
| 1,970,408 | Weidauer | Aug. 14, 1934 |
| 2,284,664 | Kissling | June 2, 1942 |
| 2,286,874 | Schwartz | June 16, 1942 |
| 2,353,096 | Weidauer | July 4, 1944 |
| 2,387,053 | Brown | Oct. 16, 1945 |
| 2,565,552 | Ern, Jr. | Aug. 28, 1951 |
| 2,579,521 | Sorensen | Dec. 25, 1951 |

FOREIGN PATENTS

| Number | Country | Date |
| --- | --- | --- |
| 278 | Great Britain | Jan. 22, 1878 |
| 424,807 | Great Britain | Feb. 28, 1936 |
| 752,574 | France | July 24, 1933 |